United States Patent Office 3,687,755
Patented Aug. 29, 1972

3,687,755
METHOD OF JOINING DEFORMATION-SENSITIVE ELEMENT TO DEFORMABLE MEMBER
George J. J. Randolph, Jr., R.R. 1, Box 391, Corvallis, Oreg. 97330
No Drawing. Filed Feb. 12, 1971, Ser. No. 115,069
Int. Cl. B32b 31/04, 31/26
U.S. Cl. 156—89                               10 Claims

ABSTRACT OF THE DISCLOSURE

A method of glass-bonding a deformation-sensitive element to the surface of a deformable member. The method contemplates, prior to joining of the element and member, the presurfacing of the element and of a zone on the surface of the member to produce surface finishes thereon with indices less than 16 microinches (RMS).

BACKGROUND AND SUMMARY OF THE INVENTION

This invention pertains to a method of joining a deformation-sensitive element and a deformable member. For the purpose of illustration herein, a preferred way of practicing the invention is described in conjunction with the manufacture of an electromechanical deflection sensing device, using a piezoresistive element as a deformation sensor, wherein the invention has been found to have particular utility.

There are many circumstances where it is desirable to follow, or sense, deflections that occur at different locations in various kinds of equipment. For example, one might wish to monitor the deflections which take place (in a certain direction) in a part in the frame of an aircraft. Such information might be wanted to determine the levels of stresses that occur in the part; and/or it might be wanted to generate certain control signals.

In the past, various types of so-called strain gauges have been provided for such purposes. The usual strain gauge comprises an electrical resistance element whose resistance changes when the element is deformed. Typically, a user attaches such a gauge as he wishes to a part wherein deflections are to be observed. Normally, the gauge is glued in place at a selected location on the part, with the glue then acting, hopefully, as an elastic load-transmitting medium between the part and the element in the gauge.

Such arrangements, however, have not been entirely satisfactory. With attachment of the gauge left to the individual user, very often nonuniform procedures are followed with successive attaching operations, and this results in nonuniform and nonreliable results. Particularly, this is true where different persons are involved in the different attaching operations. Further, a user in a particular instance may not properly locate, or orient, or secure a gauge, and this will produce inaccuracies. Further, an attaching process of the type mentioned requires care and accuracy, and can be time-consuming and inconvenient.

Thus, there has been an effort on the part of manufacturers of strain gauges to develop new techniques for simplifying the mounting of their gauges, and for minimizing some of the inaccuracies which have characterized past practice. In particular, manufacturers of these gauges have sought to develop and offer what might be thought of as preassembled deflection sensors, including a deformable member, and some sort of strain gauge or like deformation-sensitive element presecured to this member.

While these past efforts have to some extent minimized the mounting and orientation problems encountered heretofore, and have in many ways simplified the employment of deflection sensing devices by users, they have not satisfactorily taken care of the problem of properly securing a strain gauge element to the surface of a deformable member. Further explaining, and as was mentioned briefly earlier, it has been conventional in the past to secure a strain gauge element to a deformable member with some sort of glue. The various glues that are typically employed for this purpose, however, have not proven to be satisfactory load-transmitting media. Frequently, for example, under circumstances of repeated use, these glues lack adequate strength to maintain a good bond, and when they break down, significant errors are introduced. In addition, experience has shown that, over time, internal working in certain glues causes nonelastic internal changes which inhibit accuracy in the response of a gauge. A further difficulty is that many glues commonly used do not stand up well under harsh environmental conditions (i.e., in the presence of high temperatures, strong chemicals, etc.).

With the development in recent years of piezoresistive strain gauge elements, and newer types of wire elements, which are capable of very precise and highly accurate deflection monitoring, the inaccuracies and difficulties encountered in the mounting of such an element on a deformable member have become increasingly intolerable. In other words, whereas poor load-transmitting performance in a mounting might be acceptable under certain circumstances employing older types of strain gauge elements (which are not as sensitive as modern elements), such performance is not acceptable with these modern elements.

A general object of the present invention, therefore, is to provide a novel method of joining a deformation-sensitive element and a deformable member.

More specifically, an object of the invention is to provide such a method which produces a strong, durable and highly stable load-transmitting bond between such an element and member.

Still another object of the invention is to provide such a method which produces a bond that can readily tolerate a variety of severe environmental conditions, such as those mentioned above.

A further object of the present invention is to provide a joining method of the type so far generally indicated which contemplates the use of a ceramic material, such as glass, as the medium for joining an element and member.

Yet another object of the invention is to provide such a method which features, prior to joining of an element and member, presurfacing of the element and member to produce surface finish indices within a certain range which promote durability and stability in a bond produced by the ceramic material.

Thus, and according to a preferred way of practicing the invention, the proposed method contemplates: preparing on the surface of a deformable member a zone having a surface finish with an index no greater than 16 microinches (RMS); processing the deformation-sensitive element to produce an outside surface finish thereon also with an index no greater than 16 microinches (RMS); and then bonding the element to the zone on the member with a heat-fusible glass bonding medium which encapsulates the element and supports it in a position closely adjacent but out of contact with the member.

As will be more fully explained below, while it is preferred to pretreat the surfaces both of the member and of the element before bonding the two, there are certain applications wherein pretreatment of the surface of a deformation-sensitive element need not be performed.

Experience has shown that under normal operating conditions of the final assembly, the ceramic bonding material employed performs most reliably if it is under compression in the assembly. The principal reason is that such material has a tendency to fracture under tension. Accordingly, still another object of the present invention is to provide a method as already outlined, which further contemplates compressing of the bonding material during joining of an element and member, whereby the mass of bonding material in the final assembly is in a state of compression. The amount of compression selected is chosen to ensure that under normal operating conditions, the bonding material remains in a state of compression.

Various other features and advantages obtained by the practice of the present invention will become more fully apparent with a reading of the detailed description of the invention which now follows.

DETAILED DESCRIPTION OF THE INVENTION

Considering a specific example of a deflection sensing device, or assembly, which was satisfactorily made in accordance with the present invention, an elongated unitary stainless steel beam, which was generally cylindrical in configuration, was employed as the deformable member in the device. The particular type of stainless steel that was used in this beam is known as #416 steel—having a coefficient of linear expansion of $6.4 \times 10^{-6}$ inches/inch-° F. within the temperature range of about 32° F. to about 1000° F. It should be noted that other types of steel (mentioned later), and in fact other materials, may be used for such a beam—the particular steel just mentioned having been selected because of its excellent strength and elasticity characteristics, suitable for many applications.

The machined surface finish on the beam, i.e., that surface finish which resulted during normal manufacture of the beam, was about 63 microinches (RMS). As is understood by those skilled in the art, the term "microinches (RMS)" is a conventional one used as an index to describe the roughness of a surface.

According to the invention, it was important that a zone (of a suitable area which is completely a matter of choice) be prepared on the surface of the beam to have a considerably smoother finish than that just mentioned—and more specifically, a surface finish with an index no greater than 16 microinches (RMS). In the particular example being described, the surface within the boundaries of this zone, which was about 0.3 inch by 0.5 inch in size, was prepared by polishing to have a surface finish index of about 4 microinches (RMS). The reason for the importance of this step will be more fully explained later. The exact way, however, in which the surface of such a zone is prepared or polished is not critical—it being recognized that there are various ways of satisfactorily obtaining such a surface finish.

The particular deflection-sensitive element used in the case of this example comprised an elongated slender piezoresistive bar, about 0.3 inch in length. The bar was formed from a conventional P-type silicon. The surface finish on the bar, i.e., that finish resulting during normal manufacturing of the bar, was about 50 microinches (RMS).

According to the preferred way of practicing the present invention, and in the case of the specific example being described, this bar was processed to produce an outside surface finish thereon also with an index no greater than 16 microinches (RMS). As in the case of surface finishing the zone mentioned earlier, it is recognized that there are various satisfactory ways of surface processing such a bar. In the case of the particular bar which was used herein, such processing was accomplished by etching the bar in a mixture of hydrofluoric and nitric acids. The final surface finish of the processed bar was about 4 microinches (RMS).

A pair of electrical leads were suitably connected, as by spot welding, adjacent opposite ends of the bar. It should be noted that, while the presence of such leads is important in a final deflection-sensitive device, the step of joining them to the piezoresistive bar does not comprise part of the present invention.

According to the invention, and following the surface finishing steps described above, a ceramic bonding material was employed to bond the processed piezoresistive bar to the surface of the prepared zone on the deformable beam. A ceramic material was selected for this purpose since such material, when properly adhered to a bar and beam, exhibits excellent load-transmitting characteristics. As distinguished from glues previously employed in the joining of strain gauge elements and deformable members, a ceramic bonding material is extremely durable and stable, and when properly adhered to the elements that it joins, it accurately transmits deflection information. In addition, it is a very hardy type of material which stands up well under various kinds of severe environmental conditions, such as those mentioned briefly earlier.

Of the various types of ceramic materials which may be employed, glass is preferred in most applications because of its exceptional elastic characteristics. In the specific example being described, the bonding medium employed was a product made currently by Corning Glassworks, Corning, N.Y., sold under the name "Pyroceram" cement #89. This material, which is supplied in a dry powdered form, is thermoplastic, and is fusible under heat into a hardened form. When fused, it forms a unitary mass of glass having a coefficient of linear expansion of about $4 \times 10^{-6}$ inches/inch-° F.

It will be noted that this linear expansion coefficient is less than the expansion cofficient described earlier for the particular steel used in the beam. In particular, it will be noted that the expansion coefficient of this glass material, while less than the expansion coefficient of the beam material, is greater than one-half the expansion coefficient of the beam material. This relationship of expansion coefficients is important in the practice of the present invention. The reason for this has to do with the way in which the finally assembled deflection sensing device performs under normal load conditions.

Further explaining, and as will be more fully outlined shortly, the bonding material is formed into a mass on the prepared zone on the surface of the beam, with the piezoresistive bar encapsulated within this mass. Heat is used (both on the mass and on the beam) to fuse the mass in place on the beam. On cooling of the assembly, the material in the mass, because of its smaller linear expansion coefficient, is placed under a certain amount of compression (by virtue of greater contraction occurring in the adjacent beam material). Such compression, as mentioned earlier, has been found to be desirable, since it minimizes the chance that during operation of the sensing device, excessive tension will develop in the mass. Many ceramic materials including glass, and also as mentioned above, are quite susceptible to fracturing under tension, and it is thus desirable to have the material in the bonding mass perform (as much as possible) under compressive conditions. Thus, compressing the medium in the mass, during bonding, is an important step herein. Satisfactory compressive conditions have been found to result with the magnitudes of the respective expansion coefficients related as indicated above.

Contining now with a description of the practice of the invention, after preparation of the zone on the beam, and processing of the outside surface of the piezoresistive bar, the bar and beam were joined through the glass bonding medium mentioned. More specifically, a nonfused deposit of the powdered glass were suitably placed on and within the boundaries of the zone on the beam. This deposit on the beam was then fused through subjecting the beam and deposit to heat at a temperature of about 825° F., for a period of about one hour, with the beam and deposit then cooled.

The piezoresistive bar was then seated on the glass deposit on the beam, and another deposit of nonfused powdered glass prepared over this assembly (i.e., over the piezoresistive bar and the underlying glass deposit on the beam) to encapsulate the bar completely. The outer ends of the electrical leads attached to the bar were, of course, not covered, but were rather left exposed. This assembly was then subjected to heat at a temperature of about 825° F., for a period of about one hour, and then allowed to cool. Such operation fused the second deposit of glass together with the first deposit, to produce a unitary mass of compressed glass on the beam completely encapsulating the piezoresistive bar. The first-prepared glass deposit supported the bar in a position, throughout this latter heating and cooling operation, closely adjacent but out of contact with the surface of the beam.

As was mentioned earlier, two of the important steps in the method just described are those that have to do with preparing the surfaces of a deflection-sensitive element and a zone on a deformable member. Experience has shown that in all instances for satisfactory performance to result in the final assembly, it is necessary to prepare a zone on a deformable member as indicated. For many applications, it is desirable also to process the surface of the deflection-sensitive element—but it is recognized that there are some applications where this step may be omitted.

The reason that these surface finshing steps are important, is that the roughness of the surface to which a ceramic bonding material (such as that mentioned) is adhered plays a significant role in determining how durable and how reliable the bonding material will be as a load-transmitting medium. More specifically, with the finish of a supporting surface for such a material having a finished index less than 16 microinches (RMS), stress concentrations in the material under normal operating conditions are maintained relatively uniform, and the material is enabled to perform satisfactorily over a relatively wide range of loads applied to a deformable member. Experience in the practice of the invention has shown that a supporting surface with a finish index above 16 microinches (RMS) results in a supported ceramic deposit developing regions of nonuniformly high stress concentrations during deforming of the deformable member. Such stress concentrations can result in shattering of the material in a deposit, under operating conditions which are well within the operating capacity of the material with the underlying surface finish index below 16 microinches (RMS).

One of the surprising consequences of the surface finishing steps contemplated by the invention, is that in addition to significantly minimizing undesirable stress concentrations in the ceramic bonding material, such steps do not appreciably impair the establishment of a good bond between the ceramic material and the components that it joins. In other words, tests conducted on the deflection sensing devices assembled as just described failed to indicate any tendency of the glass to slip with respect to the piezoresistive bar on the beam. Thus, and according to the invention, the use of a ceramic bonding material, such as glass, can be used practically as a load-transmitting medium in a deflection sensing device.

As was mentioned earlier, it is recognized that there are other steels and other materials which can be used as a deformable member in the practice of the invention. In other words, the invention is not limited to practice with any particular type of deformable member. For example, other types of steels in connection with which the invention has been successfully practiced include #440C steel, and #6 (type 430) steel. These two steels have the following respective coefficient of linear expansion: $5.6 \times 10^{-6}$ inches/inch-° F. and $6.3 \times 10^{-6}$ inches/inch-° F. It will be noted that these expansion coefficients have the proper relationship to that of the particular glass bonding material described herein.

It is also recognized that other types of ceramic bonding materials may be used. Generally speaking, it is desirable to choose such a material which exhibits good durability and good elastic qualities. In addition, it is important to remember that the linear expansion coefficient of the particular ceramic material chosen should be related as indicated herein with respect to the linear expansion coefficient of the material in the deformable member.

Also it should be pointed out that the practice of the invention is not limited to use in conjunction with piezoresistive type strain gauge elements. For example, there are various types of conventional wire strain gauge elements which may be mounted on a deformable member as contemplated herein.

A further point which should be made has to do with the way in which the encapsulating mass is prepared. It is appreciated that while certain specific steps were described herein, such having been found to be convenient, these particular steps are not critical. In other words, while it has been found to be convenient to prepare, first, a deposit on the presurfaced zone, on a deformable member, which deposit is then fused, and next, another deposit covering a deformation-sensitive element which has been placed on the first deposit, with this second deposit then fused with the first, other techniques may be used. For example, the total encapsulating mass may be prepared all at once if such is desirable. It is important, however, that whatever particular technique is used, care must be taken to ensure that the ceramic mass does not contact the surface of the deformable member outside the boundaries of the presurfaced zone, and that the deformation-sensitive element be supported in the mass out of contact with the member. Failure to observe the former precaution may result in there being undesirable regions of high stress concentration in the mass. And, failure to observe the latter precaution may result in there being poor load-transmission between the member and element during performance.

The invention thus provides a novel method of joining a deformation-sensitive element to a deformable member, with such method contemplating the use of a ceramic bonding material for this purpose. The excellent load-transmitting features offered by such a bonding material, are practically obtained, according to the invention, through special prebonding surface-processing steps which assure good, nondestructive, low-stress bonds between this material and the presurfaced components that it joins.

While a preferred method of practicing the invention has been described herein, it is recognized that the various steps in the method may be satisfactorily carried out in a number of different ways, all coming within the spirit of the invention.

It is claimed and desired to secure by Letters Patent:

1. A method of joining a deformation-sensitive element to the surface of a deformable member comprising
    preparing on said surface a zone having a surface finish with an index no greater than 16 microinches (RMS), and
    bonding said element to said zone with a ceramic bonding medium which is interposed between the element and member and which contacts the member only within the boundaries of said zone.

2. The method of claim 1 which further comprises, prior to said bonding step, processing said element to produce a surface finish thereon with an index no greater than 16 microinches (RMS).

3. The method of claim 1 which further comprises producing a state of compression in said medium during said bonding step.

4. A method of joining a deformation-sensitive element to the surface of a deformable member comprising
    preparing on said surface a zone having a surface finish with an index no greater than 16 microinches (RMS),
    encapsulating said element in a ceramic bonding medium, and
    through said medium bonding said element to said zone with the bonding medium contacting the member only within the boundaries of said zone.

5. The method of claim 4 which further comprises, prior to said bonding step, processing said element to produce a surface finish thereon with an index no greater than 16 microinches (RMS).

6. A method of joining a deformation-sensitive element to the surface of a deformable member comprising
preparing on said surface a zone having a surface finish with an index no greater than 16 microinches (RMS),
producing on and within the boundaries of said zone a mass of a heat-fusible ceramic bonding medium which encapsulates said element and supports the same in a position adjacent but out of contact with said member,
heating said mass to fuse said medium, and
thereafter cooling the fused medium.

7. The method of claim 6 which further comprises processing said element to produce a surface finish thereon with an index no greater than 16 microinches (RMS) prior to introducing the element into said mass.

8. The method of claim 7 which further comprises, during said cooling step, compressing the medium in said mass.

9. A method of joining a deformation-sensitive element to the surface of a deformable member comprising
preparing on said surface a zone having a surface finish with an index no greater than 16 microinches (RMS),
processing said element to produce a surface finish thereon also with an index no greater than 16 microinches (RMS), and
bonding said element to said zone with a heat-fusible glass medium to produce an assembly wherein the element is encapsulated in the medium and is held adjacent and out of contact with the member, and the medium contacts the member only within the boundaries of said zone.

10. The method of claim 9, wherein the glass medium employed has a coefficient of linear expansion which is no greater than, and no less than one-half, that of the material forming said member, and said bonding is accomplished through depositing the medium in a nonfused state in a manner producing a mass of the medium on said zone which mass encapsulates said element, heating the assembly of the mass, element and member to fuse the medium in the mass, and thereafter cooling such assembly.

References Cited
UNITED STATES PATENTS

| | | | |
|---|---|---|---|
| 3,247,314 | 4/1966 | Mittendorf | 161—196 X |
| 3,378,704 | 4/1968 | Miller et al. | 156—89 X |
| 3,428,933 | 2/1969 | Gerstenberger | 156—248 X |

WILLIAM A. POWELL, Primary Examiner

U.S. Cl. X.R.

156—3, 280; 161—192; 338—2